US012635047B2

(12) United States Patent
Slade

(10) Patent No.: US 12,635,047 B2
(45) Date of Patent: May 19, 2026

(54) LIGHTING CONTROL FOR COLOR MIXING

(71) Applicant: Electronic Theatre Controls, Inc., Middleton, WI (US)

(72) Inventor: Andrew Slade, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 187 days.

(21) Appl. No.: 18/310,754

(22) Filed: May 2, 2023

(65) Prior Publication Data

US 2024/0373523 A1 Nov. 7, 2024

(51) Int. Cl.
*H05B 45/30* (2020.01)
*H05B 45/20* (2020.01)
*H05B 45/325* (2020.01)

(52) U.S. Cl.
CPC ........... *H05B 45/20* (2020.01); *H05B 45/325* (2020.01)

(58) Field of Classification Search
CPC ...... H05B 45/20; H05B 45/30; H05B 45/325; H05B 47/10
See application file for complete search history.

(56) References Cited

U.S. PATENT DOCUMENTS

| | | | |
|---|---|---|---|
| 8,159,139 | B2 | 4/2012 | Blaut et al. |
| 8,754,585 | B1 | 6/2014 | Bahrehmand |
| 8,823,281 | B2 | 9/2014 | Peting et al. |
| 9,578,701 | B1 | 2/2017 | Logiudice et al. |
| 9,706,613 | B2 | 7/2017 | Gibbs |
| 10,278,244 | B1 | 4/2019 | Bahrehmand |
| 10,314,127 | B2 | 6/2019 | Zheng |
| 10,491,032 | B2 | 11/2019 | Chen |
| 10,667,362 | B1 | 5/2020 | Coetzee et al. |
| 10,750,592 | B1 | 8/2020 | Price et al. |
| 10,841,998 | B1 | 11/2020 | Vollmer et al. |
| 11,140,758 | B2 | 10/2021 | Qiu et al. |

(Continued)

FOREIGN PATENT DOCUMENTS

| | | | |
|---|---|---|---|
| CN | 111654948 | A | 9/2020 |
| DE | 202012101221 | U1 | 5/2012 |

(Continued)

OTHER PUBLICATIONS

United Kingdom Intellectual Property Office Combined Search and Examination Report for Application No. 2401742.8 dated Nov. 26, 2024 (10 pages).

*Primary Examiner* — Jimmy T Vu
(74) *Attorney, Agent, or Firm* — Michael Best & Friedrich LLP

(57) ABSTRACT

Lighting control systems including a driver circuit. One example lighting control system includes an input node, a first light source connected to the input node and configured to generate a first light, and a second light source connected to the input node and configured to generate a second light. The lighting control system also includes a driver circuit connected to the input node. The driver circuit is configured to receive a first signal indicating a driving state of the lighting control system, receive a second signal indicating a magnitude value of an output signal, and generate the output signal based on the first signal and the second signal. The driver circuit is configured to provide the output signal to the input node to control the first light source and the second light source.

17 Claims, 10 Drawing Sheets

(56) References Cited

U.S. PATENT DOCUMENTS

| | | | | |
|---|---|---|---|---|
| 11,415,274 | B2 | 8/2022 | Shao | |
| 2011/0121755 | A1* | 5/2011 | Han | H05B 45/3725 315/294 |
| 2011/0221358 | A1 | 9/2011 | Yang et al. | |
| 2013/0009560 | A1 | 1/2013 | Takeda et al. | |
| 2013/0106305 | A1* | 5/2013 | Whitaker | H05B 47/10 315/210 |
| 2015/0163880 | A1 | 6/2015 | Sun et al. | |
| 2016/0234895 | A1 | 8/2016 | Delos Ayllon | |
| 2017/0273154 | A1 | 9/2017 | Miskin | |
| 2018/0007753 | A1 | 1/2018 | Kuang et al. | |
| 2020/0154545 | A1* | 5/2020 | An | H05B 45/3574 |
| 2021/0043821 | A1 | 2/2021 | Hussell | |
| 2021/0360757 | A1 | 11/2021 | Bennette et al. | |
| 2022/0117063 | A1 | 4/2022 | Park et al. | |
| 2023/0041543 | A1 | 2/2023 | Sun et al. | |
| 2023/0043038 | A1 | 2/2023 | Marry | |
| 2024/0206029 | A1* | 6/2024 | Thurk | H05B 45/39 |

FOREIGN PATENT DOCUMENTS

| | | | |
|---|---|---|---|
| EP | 2489241 | B1 | 11/1989 |
| EP | 2814300 | A1 | 12/2014 |
| EP | 2761978 | A1 | 4/2016 |
| WO | 2012069961 | A1 | 5/2012 |
| WO | 2015004440 | A2 | 1/2015 |

* cited by examiner

LIGHTING CONTROL FOR COLOR MIXING

FIELD

Embodiments described herein relate to a lighting control system having a driver for controlling multiple light sources.

SUMMARY

Light emitting diode (LED) drivers send a single drive level to an LED string (or parallel connections of LED strings). Analog control may be used to simulate incandescent bulb color shift with LED arrays. For example, the voltage and/or current drive to the LED array may be varied. However, existing techniques perform poorly due to jumps in color temperature and/or inconsistent color temperature shift throughout the dimming range when using this analog control.

Embodiments described herein provide for a single LED driver that controls multiple LED strings on a single wire. For example, the LED driver switches an output drive between two preset levels to send separate control to two LED strings on a single wire and connected in parallel. The LED driver may be able to "swing" between two preset reference voltages to send two discrete output levels. Alternatively, the LED driver generates an output signal based on a mixture of the preset reference voltages. This differs from traditional LED drivers that use only a single reference voltage. The LED driver may operate in conjunction with a multiplexer, a controller, or other suitable electrical device.

One example provides a lighting control system comprising an input node, a first light source connected to the input node and configured to generate a first light, and a second light source connected to the input node and configured to generate a second light. The lighting control system also includes a driver circuit connected to the input node. The driver circuit is configured to receive a first signal indicating a driving state of the lighting control system, receive a second signal indicating a magnitude value of an output signal, and generate the output signal based on the first signal and the second signal. The driver circuit is configured to provide the output signal to the input node to control the first light source and the second light source.

Another example provides a method for controlling a plurality of light sources including a first light source connected to an input node and a second light source connected to the input node. The method includes receiving, with a driver circuit, a first signal indicating a driving state of the driver circuit, and receiving, with the driver circuit, a second signal indicating a magnitude value of an output signal. The method includes generating, with the driver circuit, the output signal based on the first signal and the second signal, and providing, with the driver circuit, the output signal to the input node to control the first light source and the second light source.

Another example provides a lighting control system comprising an input node, a first light source connected to the input node and configured to generate a first colored light, and a second light source connected to the input node and configured to generate a second colored light. The lighting control system also includes a multiplexer configured to generate a first signal based on a driving state of the lighting control system and a driver circuit connected to the multiplexer and to the input node. The driver circuit is configured to receive, from the multiplexer, the first signal, receive a second signal indicating a magnitude value of an output signal, and generate the output signal based on the first signal and the second signal. The driver circuit is configured to provide the output signal to the input node to control the first light source and the second light source.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practice or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components, may be utilized to implement the disclosure. Furthermore, and as described in subsequent paragraphs, the specific configurations illustrated in the drawings are intended to exemplify implementations of the disclosure. Alternative configurations are possible.

Other aspects of the embodiments will become apparent by consideration of the detailed description and accompanying drawings.

DETAILED DESCRIPTION

Figure 1:
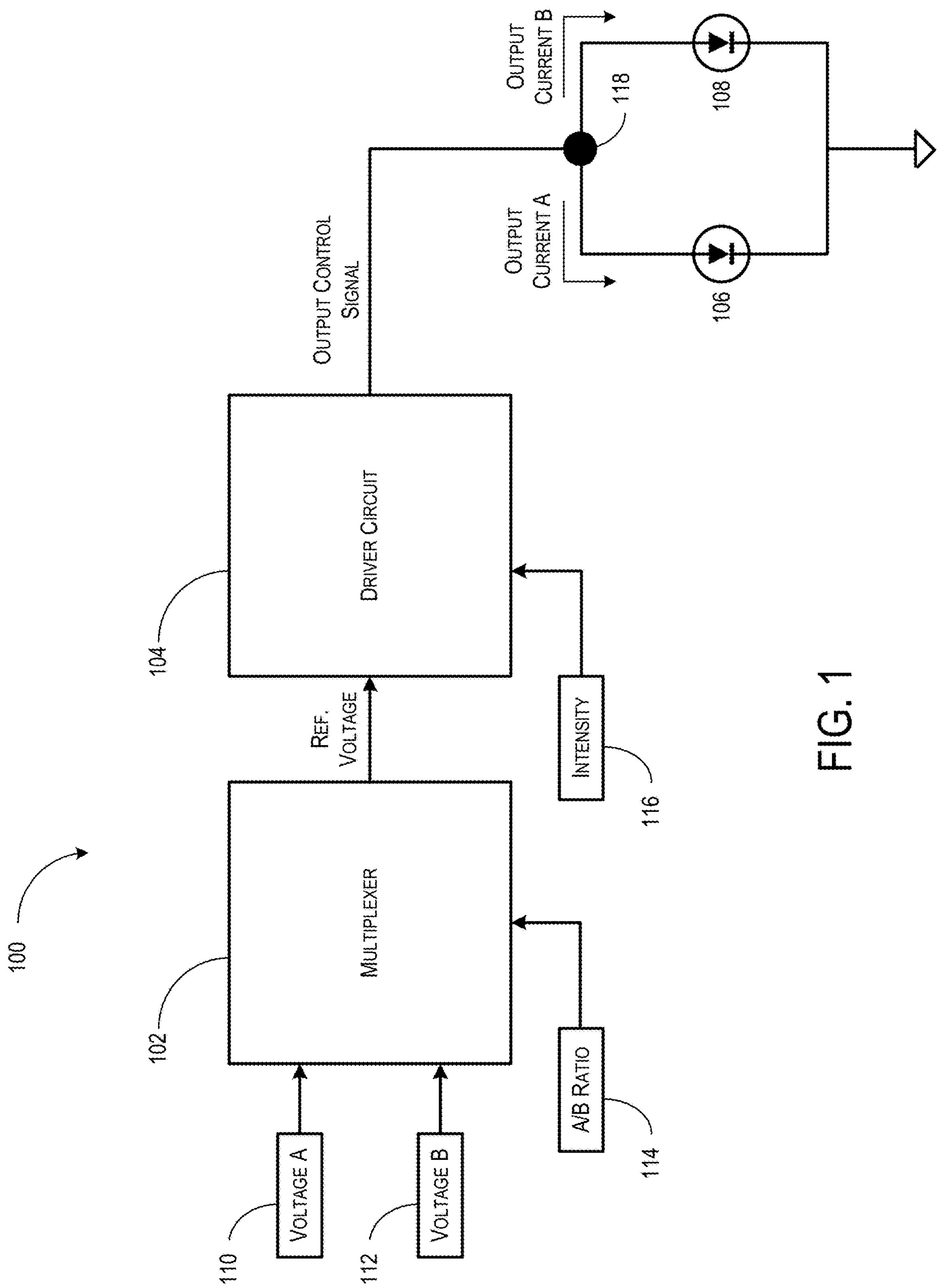
FIG. 1 is a block diagram of a lighting control system, in accordance with one example.

One or more examples, embodiments, aspects, and features are described and illustrated in the following description and accompanying drawings. These examples are not limited to the specific details provided herein and may be modified in various ways. Other examples and embodiments may exist that are not described herein. For instance, a device or structure that is "configured" in a certain way is configured in at least that way but may also be configured in ways that are not listed. Some examples described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

The phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Relational terms, for example, first and second, top and bottom, and the like may be used herein solely to distinguish one entity or action from another entity or action without necessarily requiring or implying any actual such relationship or order between such entities or actions. Embodiments or portions of an embodiment can be combined with other embodiments or portions of other embodiments to create yet further embodiments, whether or not they are specifically illustrated or described.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

FIG. 1 provides a lighting control system 100 according to one example. The lighting control system 100 may include a multiplexer 102 and a driver circuit 104 connected to a first light source 106 and a second light source 108. In some instances, the multiplexer 102, the driver circuit 104, the first light source 106, and the second light source 108 are situated within a luminaire housing. In other instances, components of the lighting control system 100 may be situated outside the luminaire housing. The first light source 106 and the second light source 108 may each be, for example, a light emitting diode (LED), a string including a plurality of LEDs, or the like.

The multiplexer 102 is connected (e.g., electrically connected and/or communicatively connected) to the driver circuit 104. The multiplexer 102 provides a reference voltage to the driver circuit 104. The multiplexer 102 may receive, among other things, a first voltage control level 110 (for example, voltage level A, a first reference voltage), a second voltage control level 112 (for example, voltage level B, a second reference voltage), and an A/B ratio signal 114. In some instances, the first voltage control level 110 and the second voltage control level 112 are constant voltage values provided to the multiplexer 102. In other instances, the first voltage control level 110 and the second voltage control level 112 may vary over time. The values of the first voltage control level 110 and the second voltage control level 112 may be selected based on the desired implementation of the first light source 106 and the second light source 108.

The A/B ratio signal 114 is a control signal that controls a ratio of the first voltage control level 110 and the second voltage control level 112 selected by the multiplexer 102. In some implementations, the A/B ratio signal 114 is a binary signal that controls the multiplexer 102 to select either the first voltage control level 110 or the second voltage control level 112. The A/B ratio signal 114 may be a pulse width modulated (PWM) signal that varies between a "high" value (for example, "1") and a "low" value (for example, "0"). In such an implementation, the A/B ratio signal 114 indicates either 0% voltage level A and 100% voltage level B, or 100% voltage level A and 0% voltage level B. Accordingly, the multiplexer 102 outputs either the first voltage control level 110 or the second voltage control level 112 to the driver circuit 104 as the reference voltage. The A/B ratio signal 114 may have a constant duty cycle, or the duty cycle may be modulated over time.

In other implementations, the A/B ratio signal 114 is an analog signal that indicates a ratio of the first voltage control level 110 and the second voltage control level 112. The A/B ratio signal 114 may be a PWM signal that is modulated between 0 and 100% depending on the desired mix of A and B. For example, the A/B ratio signal may indicate a ratio of 25% voltage level A and 75% voltage level B, 50% voltage level A and 50% voltage level B, 38% voltage level A and 62% voltage level B, or some other ratio of voltage level A and voltage level B. Accordingly, the reference voltage provided by the multiplexer 102 to the driver circuit 104 is the ratio of the first voltage control level 110 and the second voltage control level 112 indicated by the A/B ratio signal 114. Embodiments described herein may refer to the A/B ratio signal 114 as a signal that indicates a driving state of the lighting control system 100 or a driving state of the driver circuit 104.

The driver circuit 104 may be, for example a constant current (CC) driver, a constant voltage (CV) driver, an analog voltage driver, an analog current driver, or a combination thereof. The driver circuit 104 receives the reference voltage output by the multiplexer 102 and receives an intensity signal 116. The intensity signal 116 is a control signal that indicates the overall duty cycle of an output control signal output by the driver circuit 104. In some instances, the intensity signal 116 is a binary PWM signal that varies between a "high" value and a "low". In other instances, the intensity signal 116 is a PWM signal that is modulated between 0 and 100% depending on the desired output luminance of the first light source 106 and the second light source 108. The intensity signal 116 may have a constant duty cycle, or the duty cycle may be modulated over time.

The driver circuit 104 generates an output control signal based on the reference voltage output by the multiplexer 102 and based on the intensity signal 116. Particularly, in some embodiments, the driver circuit 104 transmits two individually-controllable drive levels down a single pair of wires which can be used to mix two different LED strings (e.g., the first light source 106 and the second light source 108).

Figure 2:
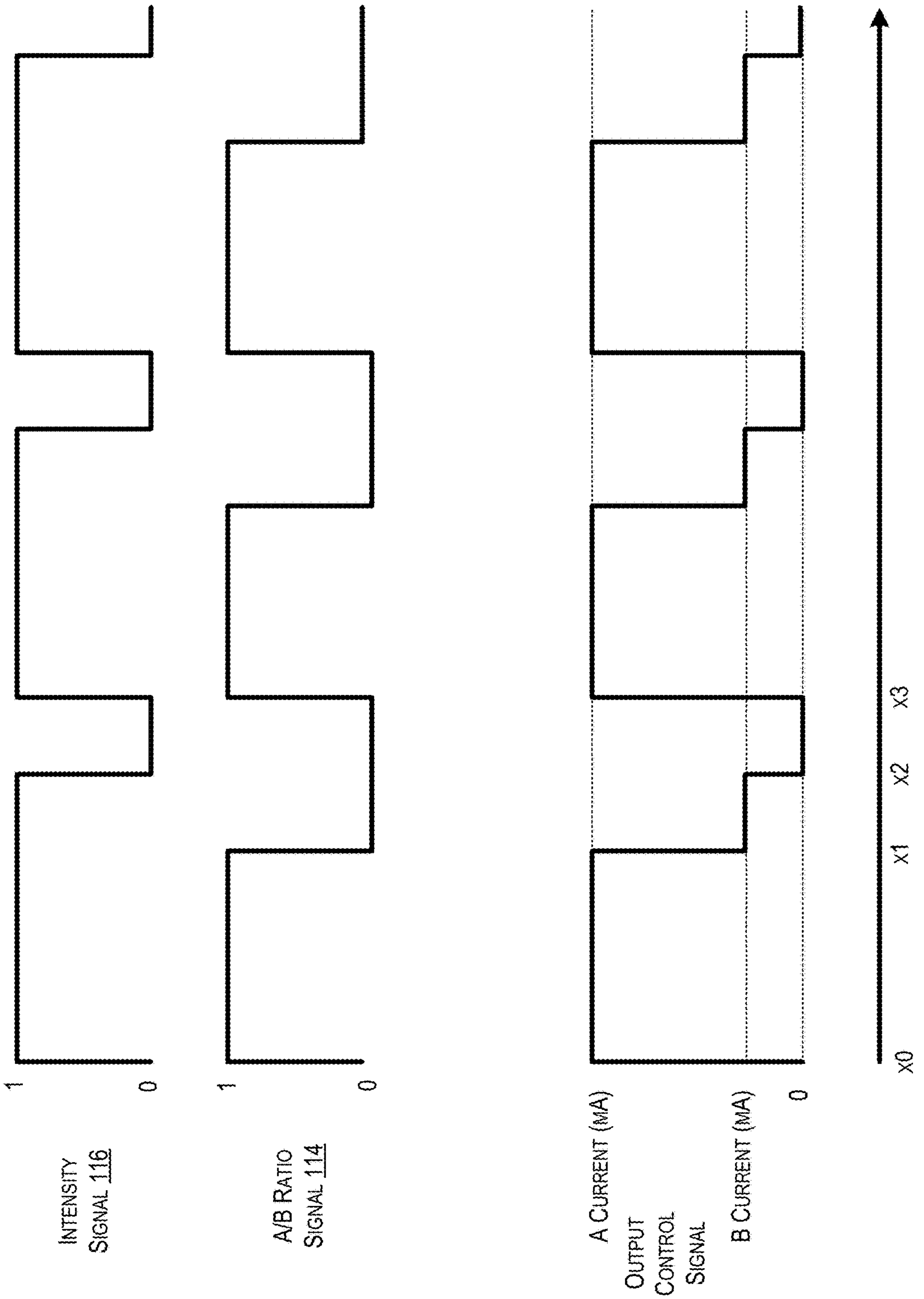
FIG. 2 is a graph of two input signals modulated to an output drive signal, in accordance with some examples.

FIG. 2 provides one example of the intensity signal 116, the A/B ratio signal 114, and corresponding output control signal from the driver circuit 104. In the example of FIG. 2, the intensity signal 116 and the A/B ratio signal 114 each are a PWM signal having a set duty cycle ratio. The example output control signal has three potential values based on the state of the intensity signal 116 and the A/B ratio signal 114 at a given time. For example, when the intensity signal 116 has a value of "1", the output control signal has a current value of either "A" or "B", based on the value of the A/B ratio signal 114. When the intensity signal 116 has a value of "0", the output control signal has a current value of 0. Additionally, when the A/B ratio signal 114 has a value of "1", the output control signal has a current value of either "A" or "0" based on the value of the intensity signal 116. When the A/B ratio signal 114 has a value of "0" the output control signal has a current value of either "B" or "0" based on the value of the intensity signal 116. In some instances, the driver circuit 104 is referred to as being in the "A" state when the output control signal has a current value of "A" and the driver circuit 104 is referred to as being in the "B" state when the output control signal has a current value of "B". These values are merely examples, and embodiments described herein may implement other current values and voltage values based on the desired implementation of the lighting control system 100.

For example, from time x0 to time x1, the intensity signal 116 and the A/B ratio signal 114 each have a value of "1". Accordingly, the output control signal has a current value of "A" and the driver circuit 104 is in the A state. From time x1 to x2, the intensity signal 116 has a value of "1" and the A/B ratio signal 114 has a value of "0". Accordingly, the output control signal has a current value of "B" and the driver circuit 104 is in the B state. From time x2 to x3, the intensity signal 116 and the A/B ratio signal 114 both have a value of "0", and the driver circuit 104 does not provide any output current.

In the example of FIG. 2, the intensity signal 116 and the A/B ratio signal 114 only vary between 100% (at the "1" value) and 0% (at the "0" value). Accordingly, when the intensity signal 116 is at 100% and the A/B ratio signal 114 is at 100%, the driver circuit 104 outputs an output control signal that results in the maximum intensity of the first light source 106. When the intensity signal 116 is at 100% and the A/B ratio signal 114 is at 0%, the driver circuit 104 outputs an output control signal that results in the maximum intensity of the second light source 108.

However, in other implementations, the intensity signal 116 and the A/B ratio signal 114 may be adjusted to values between 0 and 100%. In such implementations, mixtures of the A state and the B state of the driver circuit 104 are achieved to provide current to both the first light source 106 and the second light source 108 simultaneously.

The first voltage control level 110, the second voltage control level 112, the A/B ratio signal 114, and the intensity signal 116 may be received from an external device via a data connection (e.g., a wired connection via ethernet, a wireless connection, or the like). The external device may be, for example, a wall station, a lighting control console, an architectural control system, or the like.

Returning to FIG. 1, the output control signal is provided by the driver circuit 104 to an input node 118. The first light source 106 and the second light source 108 are both connected in parallel to the input node 118 and receive power from the input node 118. In some embodiments, when the driver circuit 104 is in the A state, the first light source 106 receives power from the driver circuit 104. In such embodiments, when the driver circuit 104 is in the B state, the second light source 108 receives power from the driver circuit 104. In some instances, both the first light source 106 and the second light source 108 receive power regardless of the state of the driver circuit 104. In such an instance, the luminance of light provided by the first light source 106 and the second light source 108 may vary based on the amplitude output control signal. In further instances, when the driver circuit 104 is in the A state, only one of the first light source 106 and the second light source 108 receives power from the driver circuit 104, and when the driver circuit 104 is in the B state, both the first light source 106 and the second light source 108 receive power from the driver circuit 104.

In some embodiments, the first light source 106 and the second light source 108 have different forward voltages. For example, the first light source 106 may have a first forward voltage (for example, 2.0 V) and the second light source 108 may have a second forward voltage greater than the first forward voltage (for example, 3.0 V). When the magnitude of the output control signal is greater than the first forward voltage but less than the second forward voltage (for example, 2.5 V), only the first light source 106 receives power. When the magnitude of the output control signal is greater than the second forward voltage (for example, 3.2 V), both the first light source 106 and the second light source 108 receive power. When the magnitude of the output control signal is less than the first forward voltage (for example, 1.8 V), neither the first light source 106 nor the second light source 108 receive power.

In the example of FIG. 1, the first light source 106 and the second light source 108 have the same polarity. However, in some instances, the first light source 106 and the second light source 108 have opposite polarities. For example, the first light source 106 may be configured to allow positive current to flow and the second light source 108 may be configured to allow negative current to flow. In such an embodiment, the output control signal may vary between a positive value and a negative value. When the output control signal is positive, current flows through the first light source 106. When the output control signal is negative, current flows through the second light source 108.

Additionally, the first light source 106 and the second light source 108 may emit different colored light. For example, the first light source 106 may emit a white light, while the second light source 108 emits a single-color light (such as red, blue, green, and/or the like). Accordingly, embodiments described herein achieve different color temperatures with smooth transitions as the temperature changes. In some embodiments, the first light source 106 and the second light source 108 form a tunable white LED array, and implementation of the driver circuit 104 provides for smooth changes in temperature of the white LED array.

Figure 3:
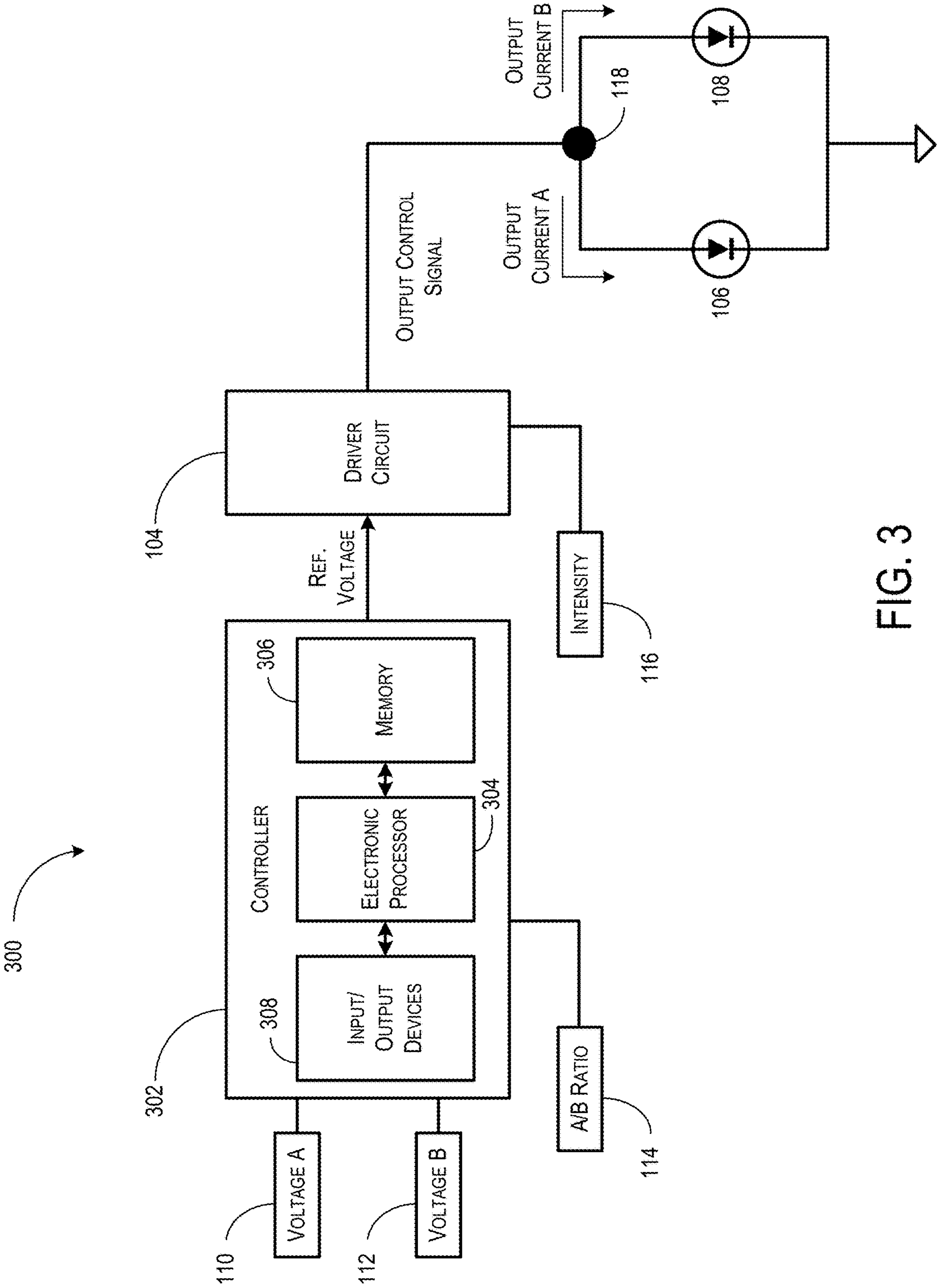
FIG. 3 is a block diagram of a lighting control system, in accordance with another example.

In some implementations, the operations of the multiplexer 102 are performed by a controller. For example, FIG. 3 provides another lighting control system 300 including a controller 302 that receives the first voltage control level 110, the second voltage control level 112, and the A/B ratio signal 114. In some implementations, the controller 302 includes, among other things, an electronic processor 304, a memory 306, and an input/output interface 308. The electronic processor 304, the memory 306, the input/output interface 308, as well as the various modules connected to the controller 302 are connected by one or more control and/or data buses (for example, a common bus). The input/output interface 308 includes routines for transferring information between components within the controller 302 and other components of the lighting control system 300. In some implementations, the controller 302 is implemented partially or entirely on a semiconductor (for example, a field-programmable gate array ["FPGA"] semiconductor) chip.

The memory 306 includes, for example, read-only memory (ROM), random access memory (RAM) (for example, dynamic RAM [DRAM], synchronous DRAM [SDRAM], etc.), electronically erasable programmable read-only memory (EEPROM), flash memory, a hard disk, an SD card, other non-transitory computer-readable media, or a combination thereof. The electronic processor 304 is connected to the memory 306 and executes software instructions that are capable of being stored in a RAM of the memory 306 (for example, during execution), a ROM of the memory 306 (for example, on a generally permanent basis), or another non-transitory computer-readable medium such as another memory or a disc. Alternatively or in addition, the memory 306 is included in the electronic processor 304. Software included in some implementations of the lighting control system 300 can be stored in the memory of the controller 302. The software includes, for example, firmware, one or more applications, program data, filters, rules, one or more program modules, and other executable instructions. In other constructions, the controller 302 includes additional fewer, or different components. For example, the controller 302 may be comprised of only hardware components, such as switches and logical gates.

In the example of FIG. 3, the controller 302 provides a reference voltage to the driver circuit 104. The driver circuit 104 generates an output control signal based on the reference voltage output by the controller 302 and based on the intensity signal 116. In some embodiments, the controller 302 also performs the operations of the driver circuit 104 or the driver circuit 104 is implemented into the controller 302.

Figure 4:
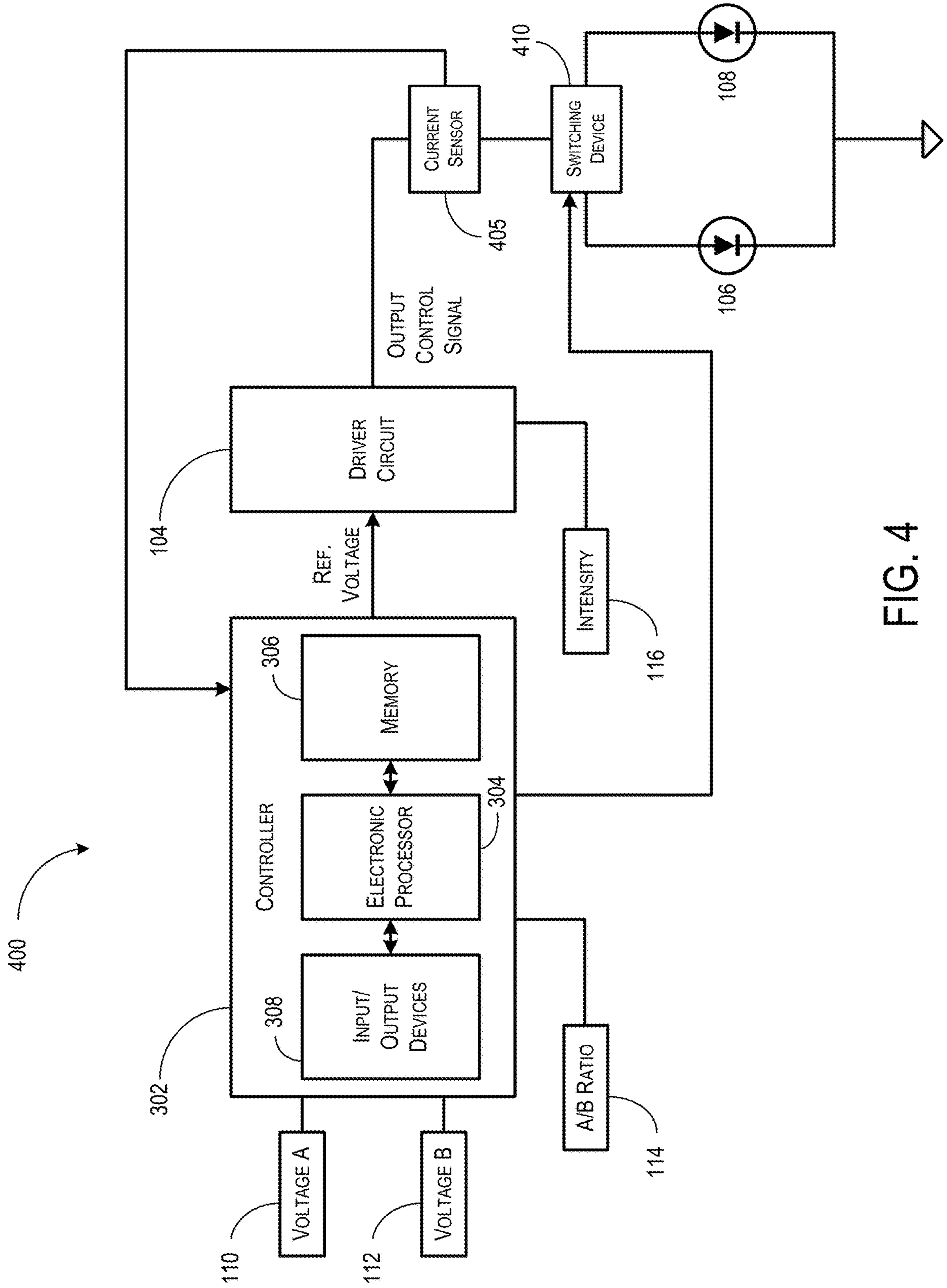
FIG. 4 is a block diagram of a lighting control system, in accordance with another example.

In some instances, a switching device is provided to control the flow of current to the first light source 106 and the second light source 108. For example, FIG. 4 provides another example lighting control system 400 including a current sensor 405 and a switching device 410. The current sensor 405 monitors a current value of the output control signal and provides a signal indicative of the current value to the controller 302. The controller 302 controls the switching device 410 to control whether the first light source 106 or the second light source 108 receives power based on the current value of the output control signal. For example, the controller 302 compares the current value to a current threshold. When the current value is below the threshold, the controller 302 controls the switching device 410 to provide current to the first light source 106. When the current value is greater than or equal to the threshold, the controller 302 controls the switching device 410 to provide current to the second light source 108.

Figure 5:
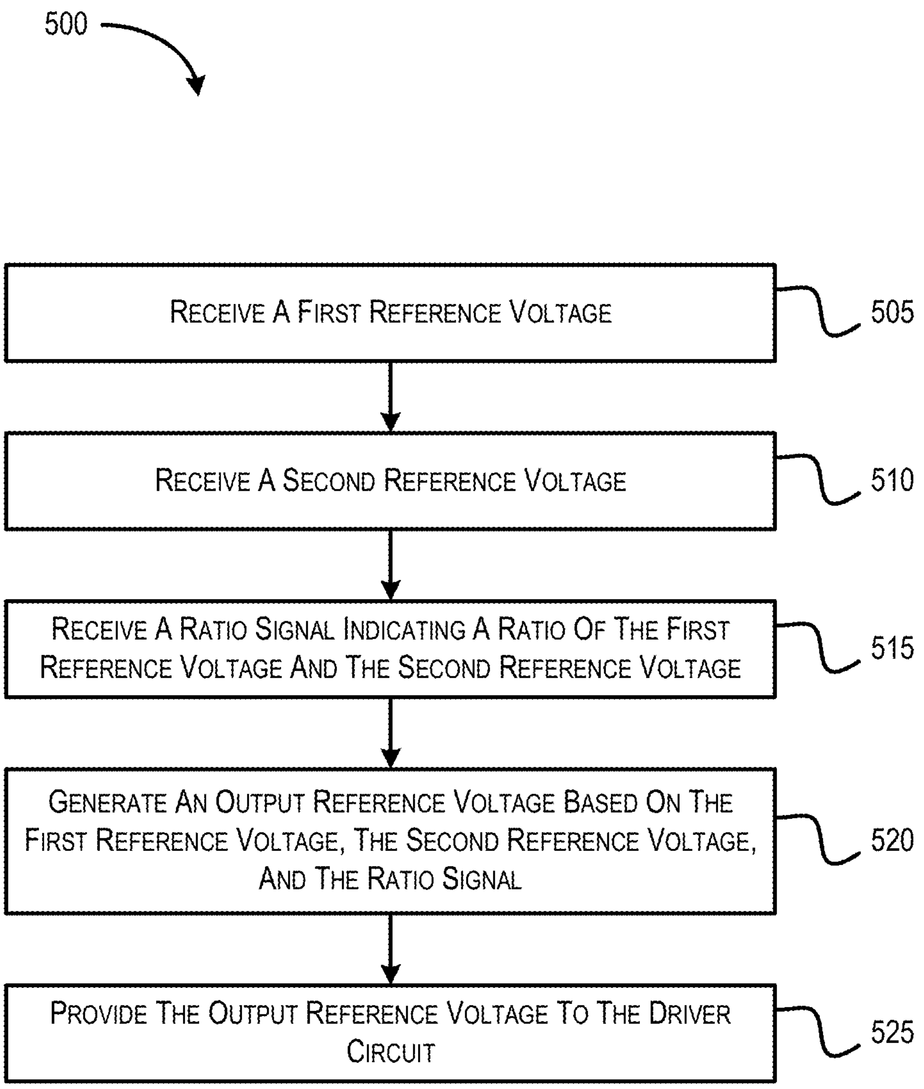
FIG. 5 is a flow chart of a method performed by the lighting control system of FIG. 1, in accordance with some examples.

FIG. 5 provides a method 500 for generating the reference voltage provided to the driver circuit 104 in accordance with some embodiments. While the method 500 is described as being performed by the controller 302, the method 500 may instead be performed by the multiplexer 102. The steps of the method 500 are described in an iterative manner for descriptive purposes. Various steps described herein with respect to the method 500 are capable of being executed simultaneously, in parallel, or in an order that differs from the illustrated serial and iterative manner of execution.

At block 505, the controller 302 receives a first reference voltage. For example, the controller 302 receives the first voltage control level 110. At block 510, the controller 302 receives a second reference voltage. For example, the controller 302 receives the second voltage control level 112. At block 515, the controller 302 receives a ratio signal indicating a ratio of the first reference voltage and the second reference voltage. For example, the controller 302 receives the A/B ratio signal 114.

At block 520, the controller 302 generates an output reference voltage based on the first reference voltage, the second reference voltage, and the ratio signal. At block 525, the controller 302 provides the output reference voltage to the driver circuit 104.

Figure 6:
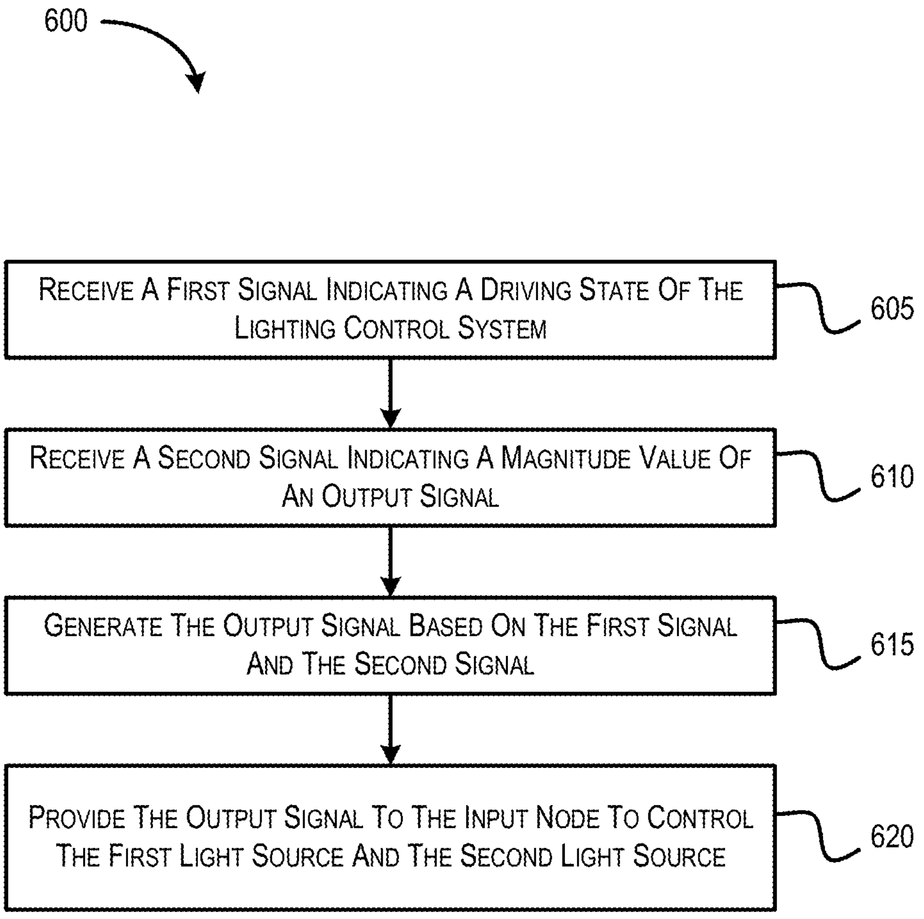
FIG. 6 is a flow chart of another method performed by the lighting control system of FIG. 1, in accordance with some examples.

FIG. 6 provides a method 600 for generating the output control signal in accordance with some embodiments. The method 600 is performed by the driver circuit 104. The steps of the method 600 are described in an iterative manner for descriptive purposes. Various steps described herein with respect to the method 600 are capable of being executed simultaneously, in parallel, or in an order that differs from the illustrated serial and iterative manner of execution.

At block 605, the driver circuit 104 receives a first signal indicating a driving state of the lighting control system 100. For example, the driver circuit 104 receives the reference voltage from the multiplexer 102 or the controller 302. At block 610, the driver circuit 104 receives a second signal indicating a magnitude value of an output signal. For example, the driver circuit 104 receives the intensity signal 116.

At block 615, the driver circuit 104 generates the output signal based on the first signal and the second signal. For example, the driver circuit 104 generates the output control signal based on the reference voltage from the multiplexer 102 or the controller 302 and based on the intensity signal 116. At block 620, the driver circuit 104 provides the output signal to the input node 118 to control the first light source 106 and the second light source 108.

Luminaires

Figure 7:
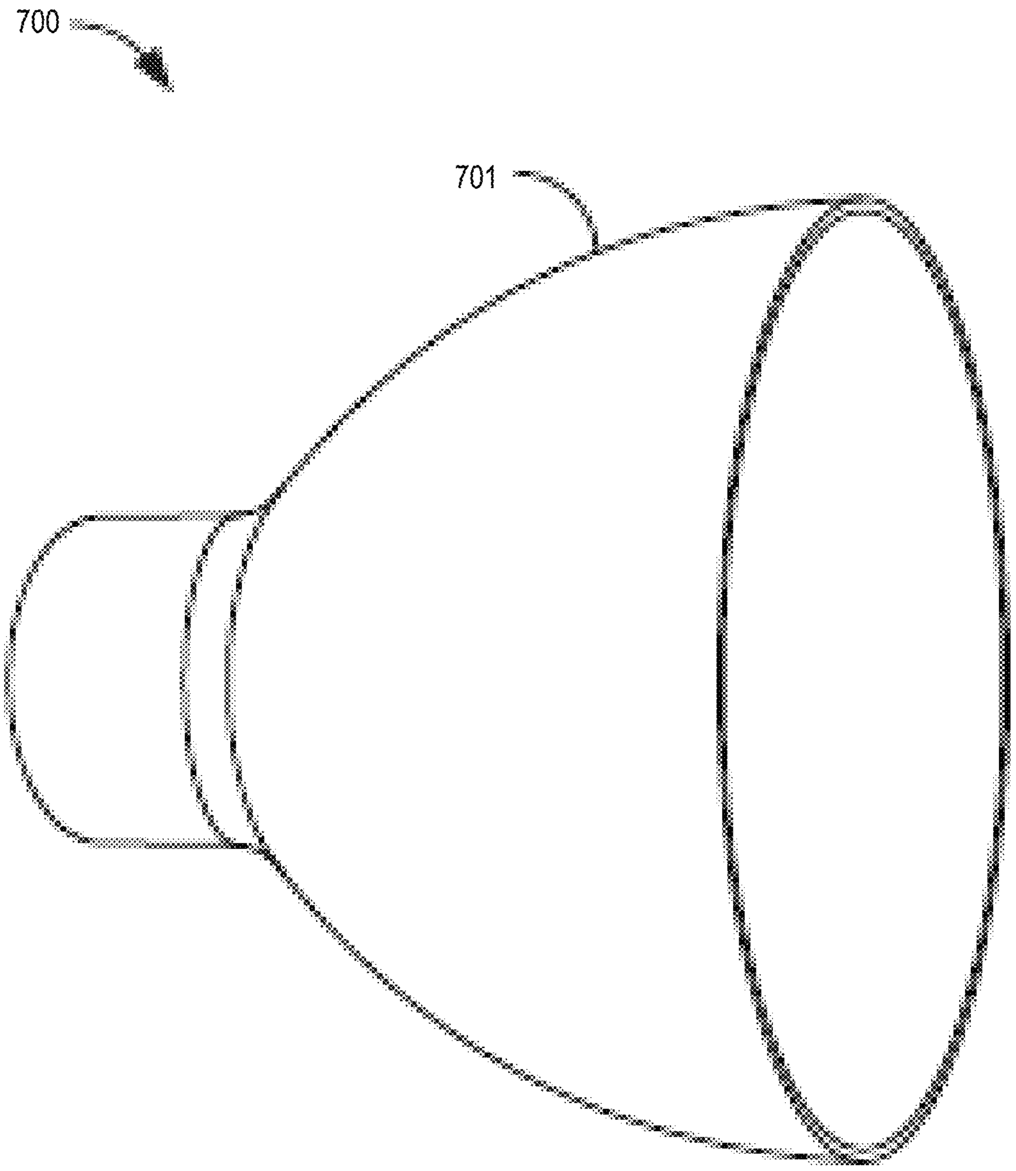
FIG. 7 is an illustration of a luminaire housing, in accordance with some examples.
Figure 8:
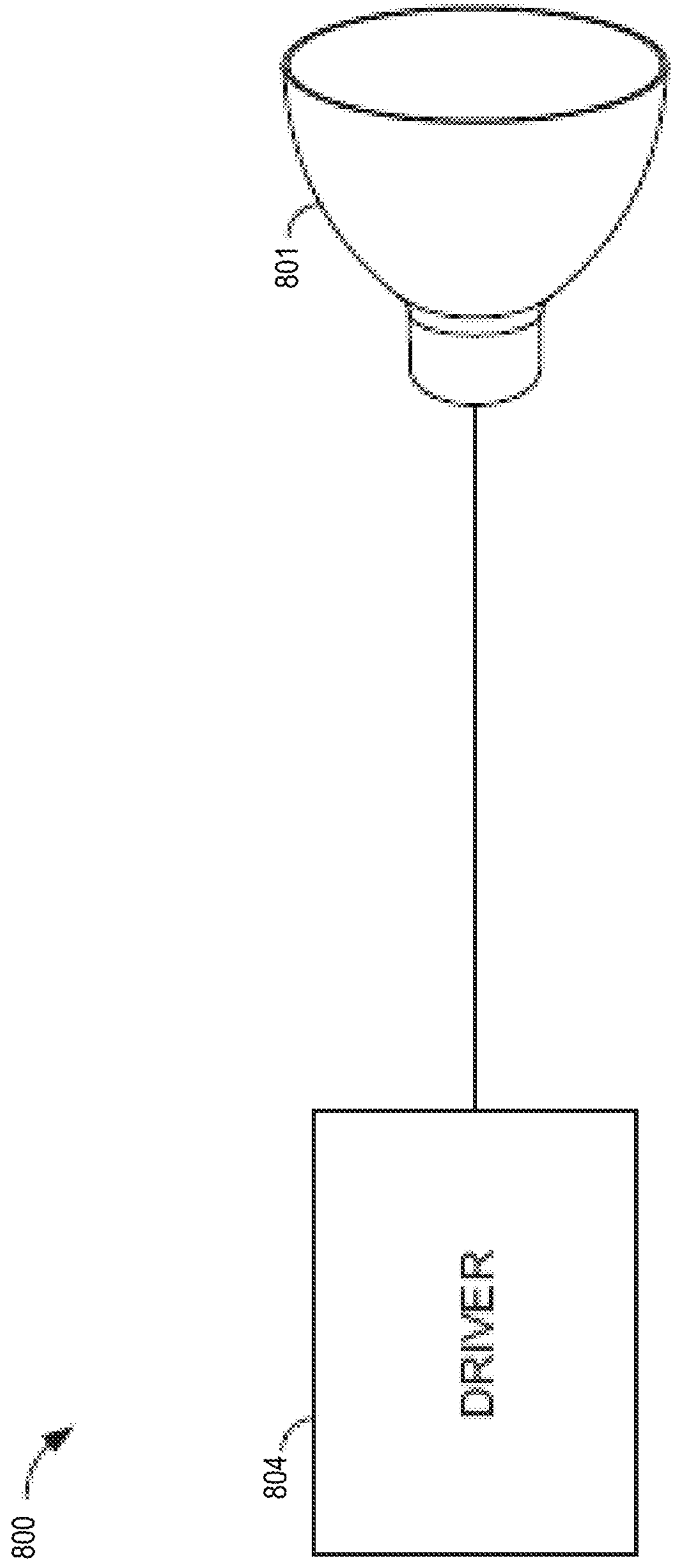
FIG. 8 is an illustration of a luminaire housing connected to a driver, in accordance with some examples.

Lighting controls systems described herein may be implemented within multiple different types of luminaires. For example, FIG. 7 illustrates a luminaire 700 according to one implementation. In FIG. 7, all components (or substantially all of the components) of the lighting control system 100 are situated within the housing 701 of the luminaire 700. However, in some instances, certain components of the lighting control system 100 may instead be situated outside of the housing 701. For example, FIG. 8 illustrates a light system 800 having a driver 804 situated outside of a luminaire housing 801. In some instances, only the lighting sources (such as first light source 106 and the second light source 108) are situated within the luminaire housing 801, while control elements (such as the multiplexer 102, the driver circuit 104, and/or the controller 302) are located external to the luminaire housing 801.

Figure 9:
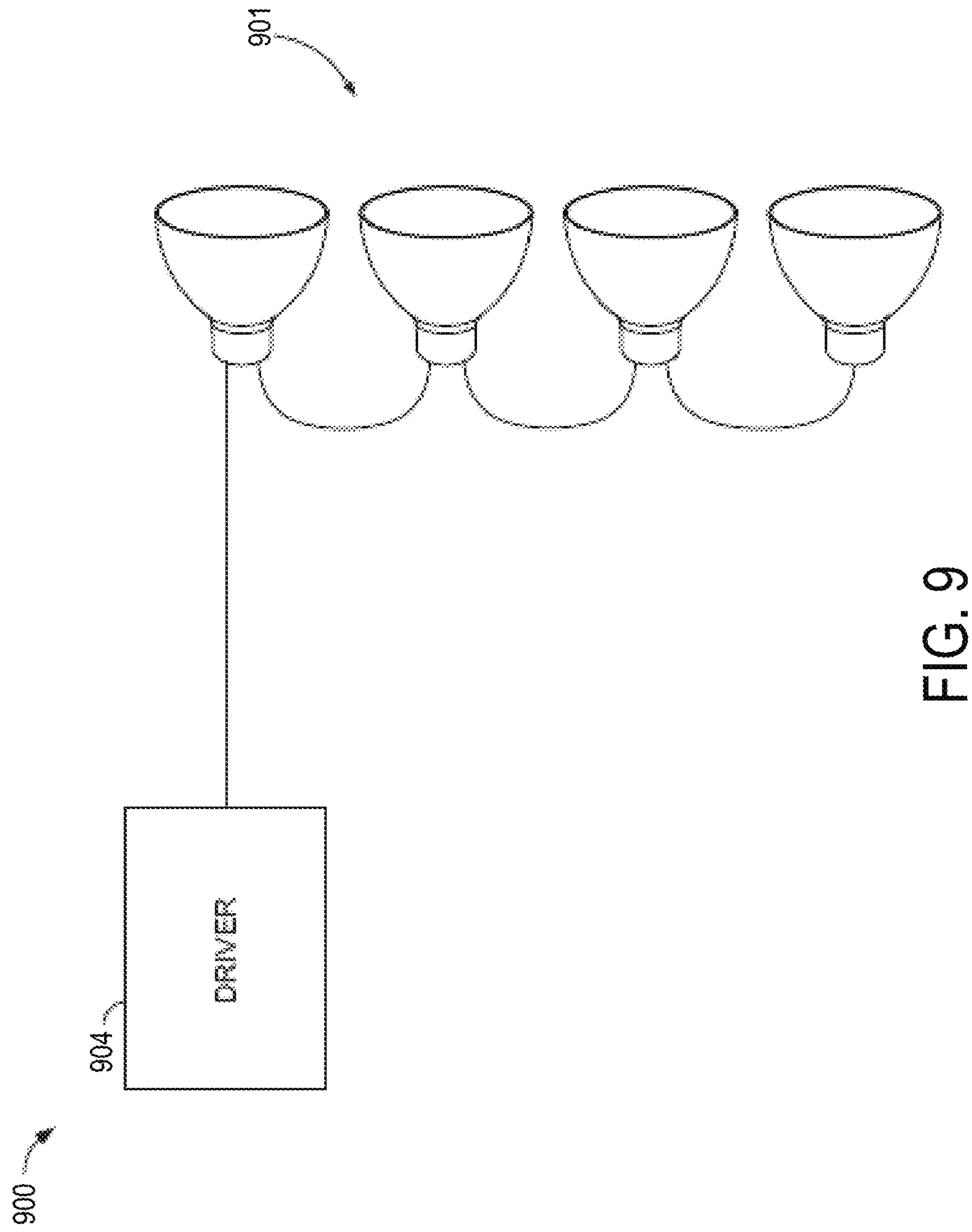
FIG. 9 is an illustration of a plurality of luminaire housings connected to a driver, in accordance with some examples.

Additionally, in some implementations, multiple luminaire housings are connected in series to control elements. For example, FIG. 9 illustrates a light system 900 having a driver 904 and a plurality of luminaire housings 901. In some embodiments, each of the luminaire housings 901 house a single lighting source (such as housing only the first light source 106 or the second light source 108). In other instances, each of the luminaire housings 901 may be identical such that they output the same light based on controls from the driver 904. The control elements (such as the multiplexer 102, the driver circuit 104, and/or the controller 302) may be located in the driver 904.

Figure 10:
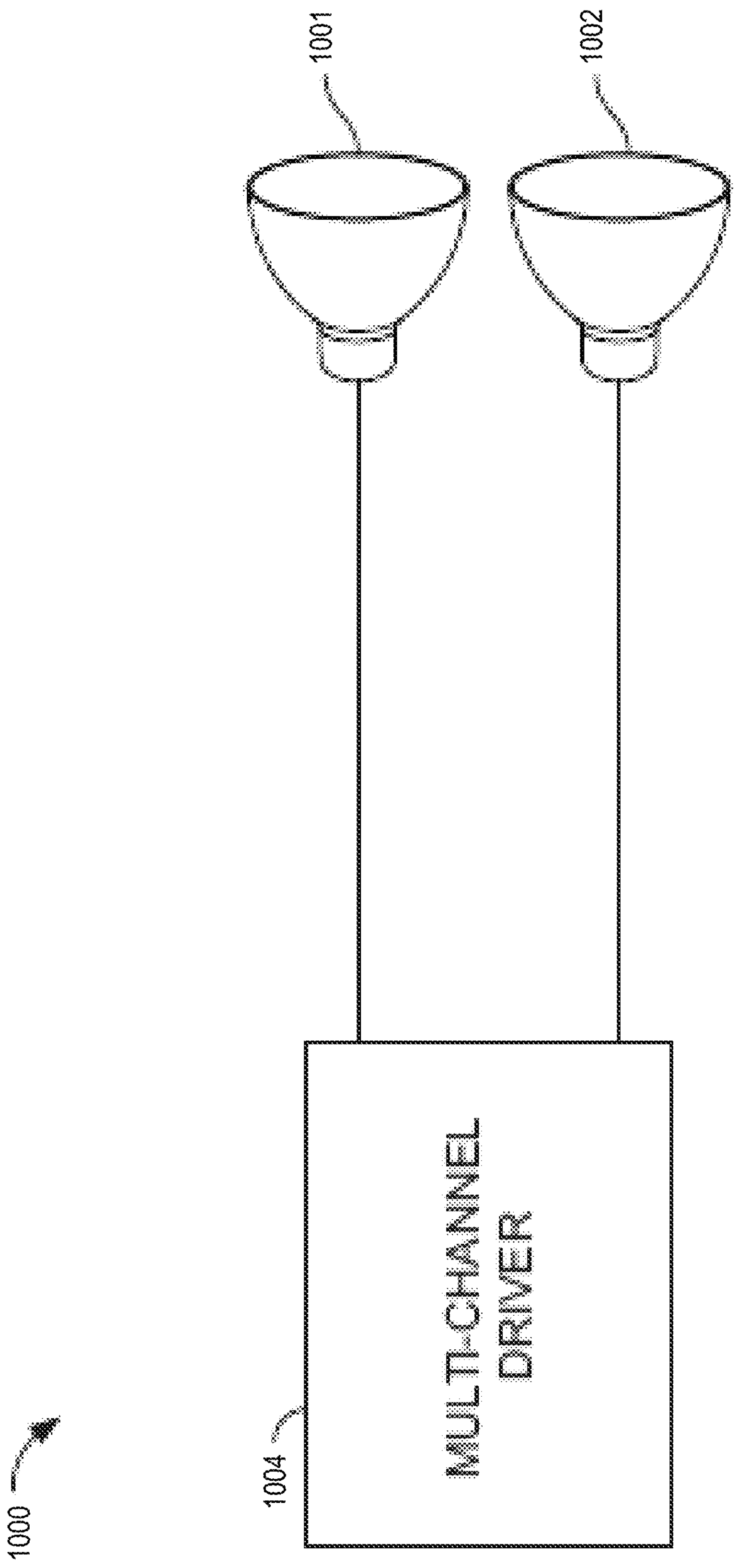
FIG. 10 is an illustration of a plurality of luminaire housings connected to a multi-channel driver, in accordance with some examples.

In some implementations, the driver circuit 104 is a multi-channel driver. For example, FIG. 10 illustrates a light system 1000 having a multi-channel driver 1004 for controlling a first luminaire 1001 and a second luminaire 1002. However, the multi-channel driver 1004 may control more than two luminaires based on the number of luminaires included in the light system 1000. The multi-channel driver 1004 may include the multiplexer 102, the driver circuit 104, and/or the controller 302. However, rather than controlling all luminaires using a single input, the first luminaire 1001 and the second luminaire 1002 are connected to the multi-channel driver 1004 at different inputs.

Thus, embodiments described herein provide, among other things, a lighting control system having a driver for controlling multiple light sources. Various features and advantages are set forth in the following claims.

What is claimed is:

1. A lighting control system comprising:
- an input node;
- a first light source connected to the input node and configured to generate a first light;
- a second light source connected to the input node and configured to generate a second light;
- a driver circuit connected to the input node and configured to:
  - receive a first signal indicating a driving state of the lighting control system,
  - receive a second signal indicating a magnitude value of an output signal,
  - generate the output signal based on the first signal and the second signal, and
  - provide the output signal to the input node to control the first light source and the second light source; and
- a switching device configured to control whether power is provided to the first light source or the second light source based on an amplitude of the output signal.

2. The lighting control system of claim 1, further comprising a controller configured to:
- receive a first reference voltage,
- receive a second reference voltage,
- receive a ratio signal indicating a ratio of the first reference voltage and the second reference voltage,
- generate the first signal based on the first reference voltage, the second reference voltage, and the ratio signal, and
- provide the first signal to the driver circuit.

3. The lighting control system of claim 2, wherein the controller is a multiplexer.

4. The lighting control system of claim 1, wherein the first light source and the second light source have a same polarity.

5. The lighting control system of claim 1, wherein the first light source has a greater forward voltage value than the second light source.

6. The lighting control system of claim 1, wherein, when a magnitude of the output signal is less than a threshold, only the first light source receives power, and wherein, when the magnitude of the output signal is greater than or equal to the threshold, both the first light source and the second light source receive power.

7. The lighting control system of claim 1, wherein the first light source and the second light source are included in an array of white light emitting diodes.

8. The lighting control system of claim 1, wherein the output signal is a pulse width modulated (PWM) signal.

9. A method for controlling a plurality of light sources including a first light source connected to an input node and a second light source connected to the input node, the method comprising:
- receiving, with a driver circuit, a first signal indicating a driving state of the driver circuit;
- receiving, with the driver circuit, a second signal indicating a magnitude value of an output signal;
- generating, with the driver circuit, the output signal based on the first signal and the second signal;
- providing, with the driver circuit, the output signal to the input node to control the first light source and the second light source; and
- controlling, with a switching device, whether power is provided to the first light source or the second light source based on an amplitude of the output signal.

10. The method of claim 9, further comprising:
- receiving, with a controller, a first reference voltage;
- receiving, with the controller, a second reference voltage;
- receiving, with the controller, a ratio signal indicating a ratio of the first reference voltage and the second reference voltage;
- generating, with the controller, the first signal based on the first reference voltage, the second reference voltage, and the ratio signal; and
- providing, with the controller, the first signal to the driver circuit.

11. The method of claim 9, wherein the first light source and the second light source have a same polarity.

12. The method of claim 9, wherein, when a magnitude of the output signal is less than a threshold, only the first light source receives power, and wherein, when the magnitude of the output signal is greater than or equal to the threshold, both the first light source and the second light source receive power.

13. A lighting control system comprising:

an input node;

a first light source connected to the input node and configured to generate a first colored light;

a second light source connected to the input node and configured to generate a colored second light different from the first colored light;

a multiplexer configured to generate a first signal based on a driving state of the lighting control system;

a driver circuit connected to the multiplexer and to the input node and configured to:

receive, from the multiplexer, the first signal, receive a second signal indicating a magnitude value of an output signal, generate the output signal based on the first signal and the second signal, and provide the output signal to the input node to control the first light source and the second light source; and a switching device configured to control whether power is provided to the first light source or the second light source based on an amplitude of the output signal.

14. The lighting control system of claim 13, the multiplexer is further configured to:

receive a first reference voltage;

receive a second reference voltage;

receive a ratio signal indicative of a ratio of the first reference voltage and the second reference voltage; and generate the first signal based on the first reference voltage, the second reference voltage, and the ratio signal.

15. The lighting control system of claim 13, wherein the first light source and the second light source have a same polarity.

16. The lighting control system of claim 13, wherein the first light source has a greater forward voltage value than the second light source.

17. The lighting control system of claim 13, wherein, when a magnitude of the output signal is less than a threshold, only the first light source receives power, and wherein, when the magnitude of the output signal is greater than or equal to the threshold, both the first light source and the second light source receive power.

* * * * *